(12) United States Patent
Li

(10) Patent No.: US 11,543,649 B2
(45) Date of Patent: Jan. 3, 2023

(54) WAVELENGTH CONVERSION DEVICE FOR PROJECTOR

(71) Applicant: Delta Electronics, Inc., Taoyuan (TW)

(72) Inventor: Jih-Chi Li, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 276 days.

(21) Appl. No.: 16/861,074

(22) Filed: Apr. 28, 2020

(65) Prior Publication Data

US 2021/0096357 A1 Apr. 1, 2021

(30) Foreign Application Priority Data

Sep. 30, 2019 (CN) .......................... 201910941373.1

(51) Int. Cl.
*G02B 26/00* (2006.01)
*G03B 21/20* (2006.01)
*G03B 21/16* (2006.01)

(52) U.S. Cl.
CPC .......... *G02B 26/008* (2013.01); *G03B 21/16* (2013.01); *G03B 21/204* (2013.01)

(58) Field of Classification Search
CPC ..... G02B 26/008; G03B 21/16; G03B 21/204
See application file for complete search history.

(56) References Cited

U.S. PATENT DOCUMENTS

| 8,203,161 B2 | 6/2012 | Simonian et al. |
| 9,431,586 B2 | 8/2016 | Eisert et al. |
| 9,519,207 B2 | 12/2016 | Nakatsu et al. |
| 9,551,474 B2 | 1/2017 | Nagao et al. |
| 9,891,511 B2 | 2/2018 | Chang et al. |
| 10,288,872 B2 | 5/2019 | Li et al. |
| 2012/0106126 A1 | 5/2012 | Nojima et al. |
| 2013/0286359 A1 | 10/2013 | Motoya et al. |
| 2016/0123557 A1 | 5/2016 | Xu et al. |
| 2016/0238922 A1* | 8/2016 | Furuyama ............ G02B 26/008 |

(Continued)

FOREIGN PATENT DOCUMENTS

| CN | 204732443 U | 10/2015 |
| CN | 204879969 U | 12/2015 |

(Continued)

*Primary Examiner* — Magda Cruz
(74) *Attorney, Agent, or Firm* — Kirton McConkie; Evan R. Witt

(57) ABSTRACT

A wavelength conversion device includes a substrate, a reflective layer, a phosphor layer and a thermal conductive layer. The substrate has a surface. The reflective layer is disposed on the surface of the substrate. The phosphor layer is disposed on the reflective layer and has a conversion region configured to perform a wavelength conversion. The thermal conductive layer is disposed on the surface of the substrate and thermally directly connected to the conversion region for conducting a heat generated at the conversion region during the wavelength conversion. The thermal resistance of the reflective layer is high and causes heat in the conversion region to accumulate. By disposing the thermal conductive layer adjacent to a side of the phosphor layer, the thermal conductive layer is thermally directly connected to the conversion region, so that the heat generated at the conversion region during the wavelength conversion is efficiently dissipated.

20 Claims, 12 Drawing Sheets

(56) References Cited

U.S. PATENT DOCUMENTS

| | | | |
|---|---|---|---|
| 2016/0252722 A1* | 9/2016 | Li | G03B 33/08 |
| | | | 362/84 |
| 2017/0059979 A1* | 3/2017 | Hsu | G02B 26/008 |
| 2018/0003363 A1 | 1/2018 | Furuyama | |
| 2019/0011817 A1 | 1/2019 | Kobayashi et al. | |
| 2019/0093871 A1 | 3/2019 | Sato et al. | |
| 2019/0121119 A1* | 4/2019 | Chen | H04N 9/3161 |
| 2020/0132261 A1* | 4/2020 | Tsai | F21K 9/64 |
| 2020/0310236 A1* | 10/2020 | Hsu | G03B 33/08 |
| 2021/0013384 A1 | 1/2021 | Li et al. | |

FOREIGN PATENT DOCUMENTS

| | | | | |
|---|---|---|---|---|
| CN | 104713035 B | | 6/2016 | |
| CN | 106195925 A | | 12/2016 | |
| CN | 105135366 B | | 4/2017 | |
| CN | 107894689 A | | 4/2018 | |
| CN | 207689824 U | * | 8/2018 | G03B 21/16 |
| CN | 106206904 B | | 5/2019 | |
| CN | 109863450 A | | 6/2019 | |
| CN | 208937894 U | | 6/2019 | |
| TW | M474264 U | | 3/2014 | |
| TW | 201531789 A | | 8/2015 | |
| TW | 201621452 A | | 6/2016 | |
| TW | 201701510 A | | 1/2017 | |
| TW | 201723627 A | | 7/2017 | |
| TW | M549365 U | | 9/2017 | |
| TW | I617059 B | | 3/2018 | |
| TW | I632323 B | | 8/2018 | |
| TW | 201906195 A | | 2/2019 | |

* cited by examiner

WAVELENGTH CONVERSION DEVICE FOR PROJECTOR

FIELD OF THE INVENTION

The present disclosure relates to a wavelength conversion device, and more particularly to a wavelength conversion device to enhance thermal conductive efficiency.

BACKGROUND OF THE INVENTION

The wavelength conversion device utilizes, for example, a laser light source to excite a phosphor to obtain a predetermined monochromatic or polychromatic light, and has been widely applied in the fields of illumination sources, projection displays and so on. Taking the projection display as an example, a laser light source is utilized to irradiate the phosphor wheel to produce the desired display color.

In the projection display application, since the reflective wavelength conversion device can provide a higher utilization efficiency of light, it is more widely used. The conventional reflective wavelength conversion device mainly includes a substrate, a reflective layer and a phosphor layer. The reflective layer is disposed between the substrate and the phosphor layer, and the phosphor layer is excited by the light source to generate the predetermined monochromatic or polychromatic light. The generated monochromatic or polychromatic light is reflected by the reflective layer at the same time. When the phosphor layer is excited by the excitation light source, it is accompanied with heat generation. Furthermore, as the power of the light source for excitation is gradually increased, the amount of heat generated from the phosphor layer is also increased. However, a conventional reflective wavelength conversion device with the reflective layer disposed on one side of the substrate and a heat dissipation device disposed on an opposite side of the substrate for heat dissipation suffers a limitation that the effective area of heat dissipation is limited, and is liable to be influenced by the reflective layer having high thermal resistance. Under the condition of high power light source for excitation, the heat generated by the phosphor layer being excited by the excitation light source cannot be dissipated in time. Consequently, the phosphor layer is performing the wavelength conversion at a high temperature and tends to deteriorate, thereby causing the light-emitting rate of the reflective wavelength conversion device to be sharply reduced.

Therefore, there is a need for providing a wavelength conversion device with enhanced thermal conductive efficiency and to address the above issues encountered by the prior arts.

SUMMARY OF THE INVENTION

In accordance with an aspect of the present disclosure, a wavelength conversion device is provided and includes a substrate, a reflective layer, a phosphor layer and a thermal conductive layer. The substrate has at least one surface. The reflective layer is disposed on the at least one surface of the substrate. The phosphor layer is disposed on the reflective layer and includes at least one conversion region configured to receive a light beam and convert a wavelength of the light beam. The thermal conductive layer is disposed on the at least one surface of the substrate and directly connected to the at least one conversion region for conducting a heat generated at the at least one conversion region during a wavelength conversion.

In accordance with another aspect of the present disclosure, a wavelength conversion device is provided and includes a reflective layer, a phosphor layer, a substrate and a thermal conductive layer. The phosphor layer is disposed on the reflective layer and includes at least one conversion region configured to receive a light beam and convert a wavelength of the light beam. The substrate has a first surface. The reflective layer is disposed between the phosphor layer and the substrate. The thermal conductive layer is disposed adjacent to the phosphor layer and directly connected to the at least one conversion region, such that a heat generated at the at least one conversion region during a wavelength conversion is transferred from the at least one conversion region of the phosphor layer to the thermal conductive layer.

In accordance with a further aspect of the present disclosure, a wavelength conversion device is provided and includes a substrate, a first phosphor layer, a reflective layer and a thermal conductive layer. The substrate includes a plate with two opposite sides. The first phosphor layer includes at least one conversion region configured to receive a light beam and convert a wavelength of the light beam. The at least one phosphor layer is disposed on one of the two opposite sides of the substrate. The reflective layer is disposed between the first phosphor layer and the substrate. The thermal conductive layer and the first phosphor layer are disposed on the same side of the substrate. The thermal conductive layer is directly connected to the at least one conversion region. A thermal conductivity coefficient of the thermal conductive layer is greater than a thermal conductivity coefficient of the first phosphor layer, and the thermal conductivity coefficient of the first phosphor layer is greater than a thermal conductivity coefficient of the reflective layer.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
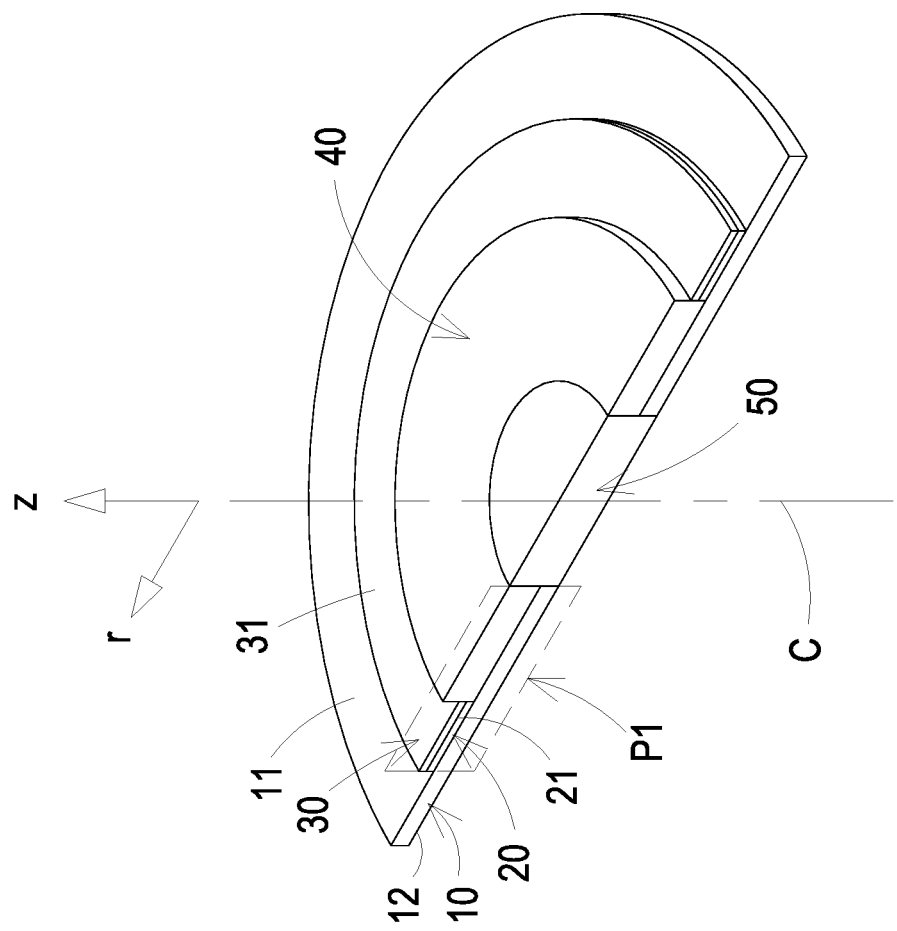
FIG. 1 is a cross-sectional structural view illustrating a wavelength conversion device according to a first embodiment of the present disclosure.
Figure 2:
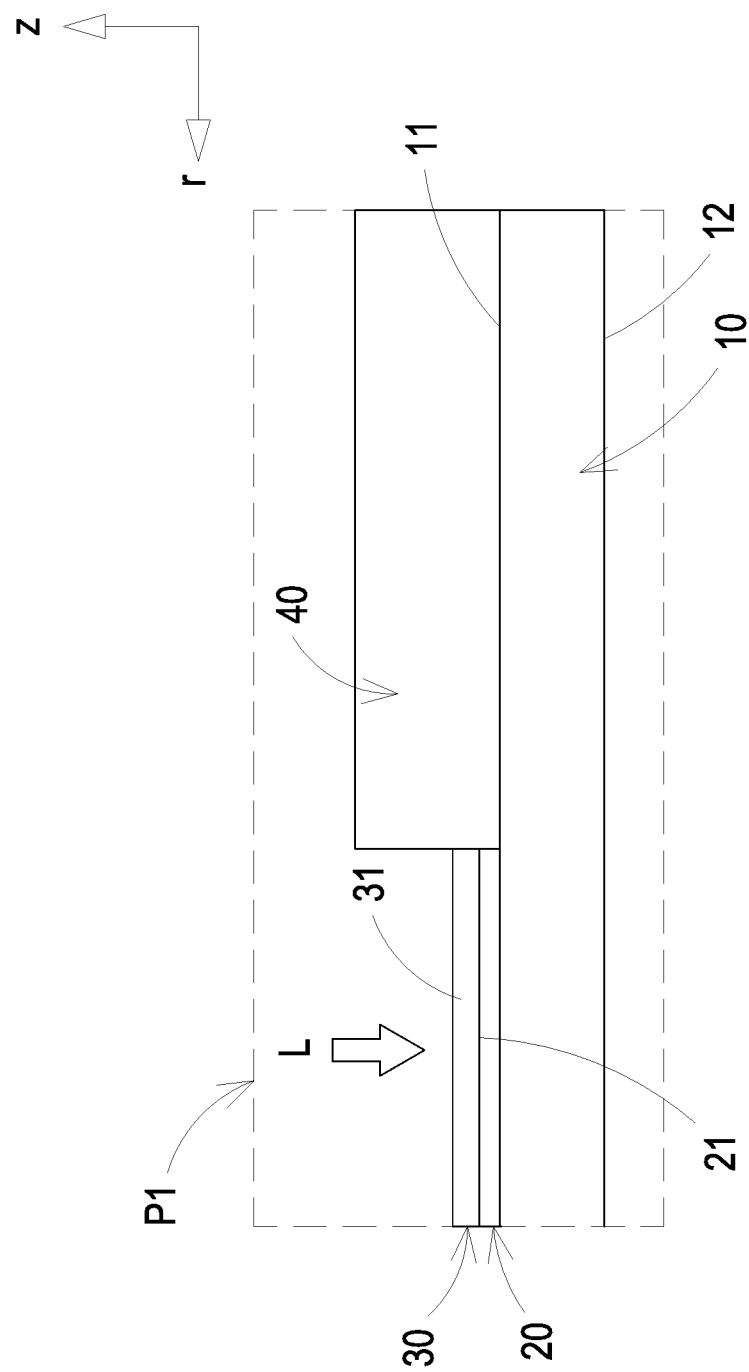
FIG. 2 is a cross-sectional view illustrating the region P1 of FIG. 1.
Figure 3:
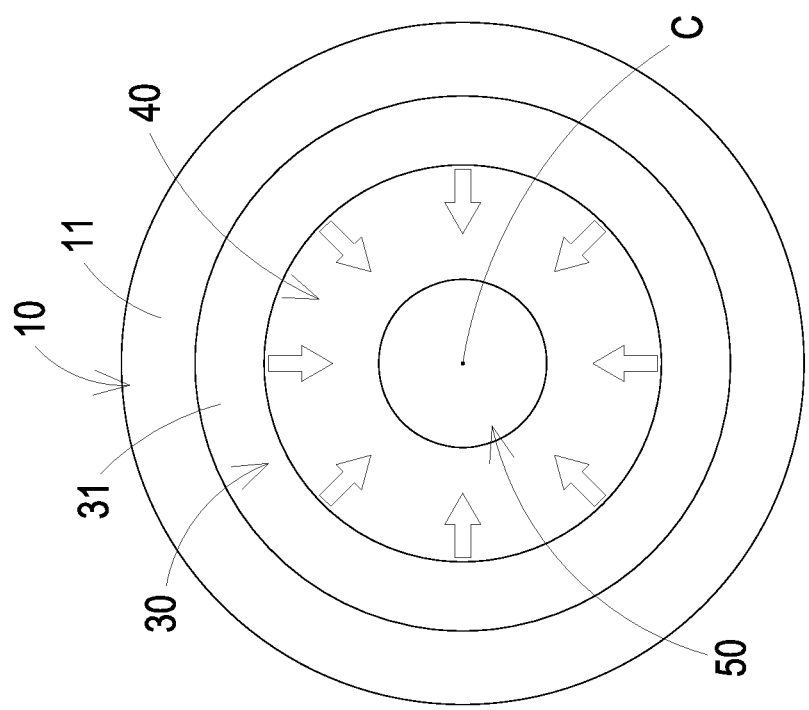
FIG. 3 is a top view illustrating the wavelength conversion device according to the first embodiment of the present disclosure.

Referring to FIGS. 1 to 3, the wavelength conversion device 1 includes a substrate 10, a reflective layer 20, a phosphor layer 30, a thermal conductive layer 40 and a driving component 50. In the embodiment, the wavelength conversion device 1 is for example, but not limited to, a color wheel of a projector. It should be noted that the wavelength conversion device 1 of the present disclosure is not limited to static use or dynamic use in practical applications. In the embodiment, the substrate 10 may be connected to the driving component 50, such as a motor shaft, by for example, an adhesive or a latching element. The wavelength conversion device 1 is driven to be displaced by the driving component 50, for example the motor shaft, so as to rotate about a rotating shaft C. In other embodiment, the driving component 50 may be omitted. Preferably but not exclusively, in the embodiment, the substrate 10 is a disc shaped body having two opposite sides (a first surface 11 and a second surface 12). The first surface 11 and the second surface 12 are opposite to each other. Preferably but not exclusively, the substrate 10 has a thickness ranging from 0.7 mm to 1.5 mm. In the embodiment, the reflective layer 20 is arranged in an annular shape and disposed on the first surface 11 of the substrate 10. Preferably but not exclusively, the reflective layer 20 has a thickness ranging from 70 μm to 150 μm. In the embodiment, the phosphor layer 30 is arranged in an annular shape and disposed on a reflective surface 21 of the reflective layer 20. Preferably but not exclusively, the phosphor layer 30 has a thickness ranging from 100 μm to 200 μm. In the embodiment, the phosphor layer 30 includes at least one conversion region 31, which is configured to perform a wavelength conversion when the conversion region 31 is irradiated by an excitation light, such as a laser light L. In addition, the thermal conductive layer 40 is disposed on the first surface 11 of the substrate 10 and adjacent to a lateral edge of the phosphor layer 30. The thermal conductive layer 40 is directly connected to the at least one conversion region 31 of the phosphor layer 30, so that the heat generated at the conversion region 31 during the wavelength conversion is dissipated therefrom. In the embodiment, the thermal conductive layer 40 and the phosphor layer 30 are disposed at the same side of the substrate 10 and located at the first surface 11 of the substrate 10. Preferably but not exclusively, the thermal conductive layer 40 has a thickness ranging from 350 μm to 400 μm, which is greater than the combined thicknesses of the reflective layer 20 and the phosphor layer 30. Preferably but not exclusively, the thermal conductivity coefficient of the reflective layer 20 ranges from 0.1 W/mK to 2 W/mK. Preferably but not exclusively, the thermal conductivity coefficient of the phosphor layer 30 ranges from 0.5 W/mK to 10 W/mK. Preferably but not exclusively, the thermal conductivity coefficient of the thermal conductive layer 40 ranges from 30 W/mK to 5300 W/mK. In the embodiment, the thermal conductivity coefficient of the thermal conductive layer 40 is greater than the thermal conductivity coefficient of the phosphor layer 30 and the thermal conductivity coefficient of the reflective layer 20, and the thermal conductivity coefficient of the phosphor layer 30 is greater than the thermal conductivity coefficient of the reflective layer 20. Thus, when the at least one conversion region 31 of the phosphor layer 30 is irradiated by an excitation light, such as a laser light L, the heat generated during the wavelength conversion is preferentially conducted from the at least one conversion region 31 to the thermal conductive layer 40 to be dissipated. With such direct heat transferring path, heat dissipation is not hindered by the reflective layer 20, which has a high thermal resistance. Effective heat dissipation also provides that the heat accumulation in the conversion region 31 is reduced, and deterioration of the wavelength conversion efficiency is lessened. Notably, when the wavelength conversion device 1 is applicable to, for example, a color wheel of a projector, the heat generated at the at least one conversion region 31 of the phosphor layer 30 during the wavelength conversion may be conducted not only in a vertical direction, for example in the axial direction (i.e. z axis direction), but also in the radial direction r, for example towards the driving component 50 and the central rotating shaft C as shown in FIG. 3. In other words, the wavelength conversion device 1 of the present disclosure further provides the heat transferring path in the horizontal direction, so that the heat generated at the at least one conversion region 31 of the phosphor layer 30 during the wavelength conversion may be dissipated more rapidly.

Figure 4:
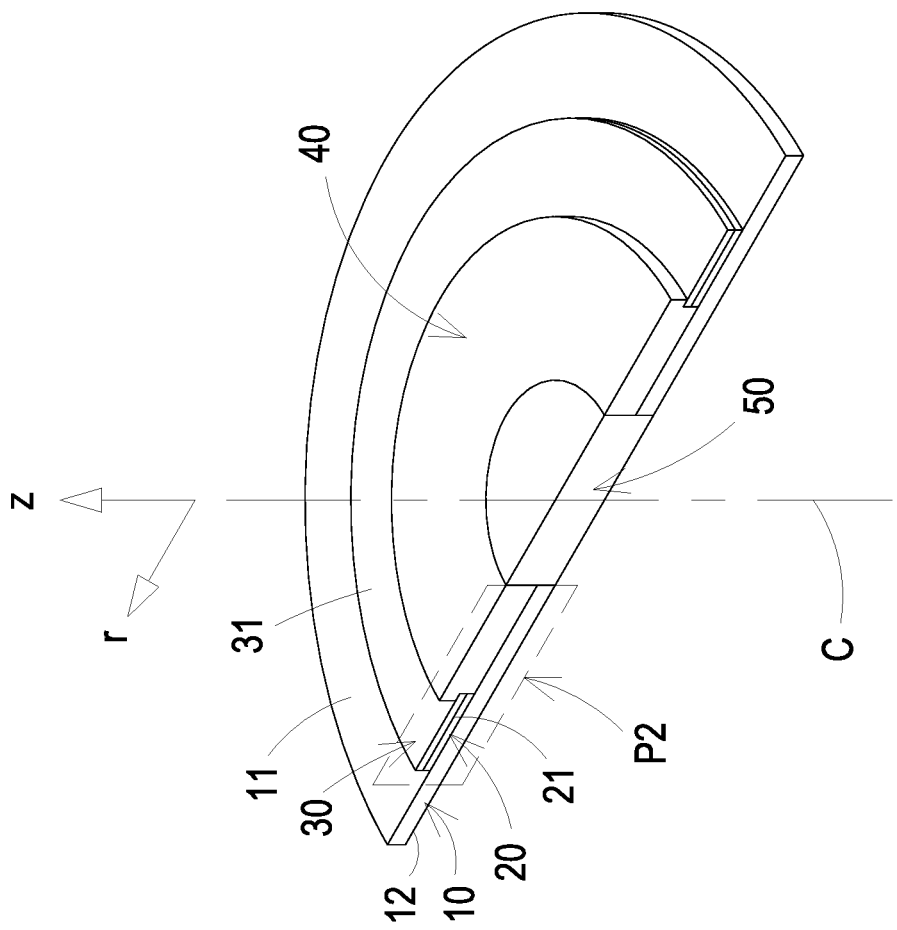
FIG. 4 is a cross-sectional structural view illustrating a wavelength conversion device according to a second embodiment of the present disclosure.
Figure 5:
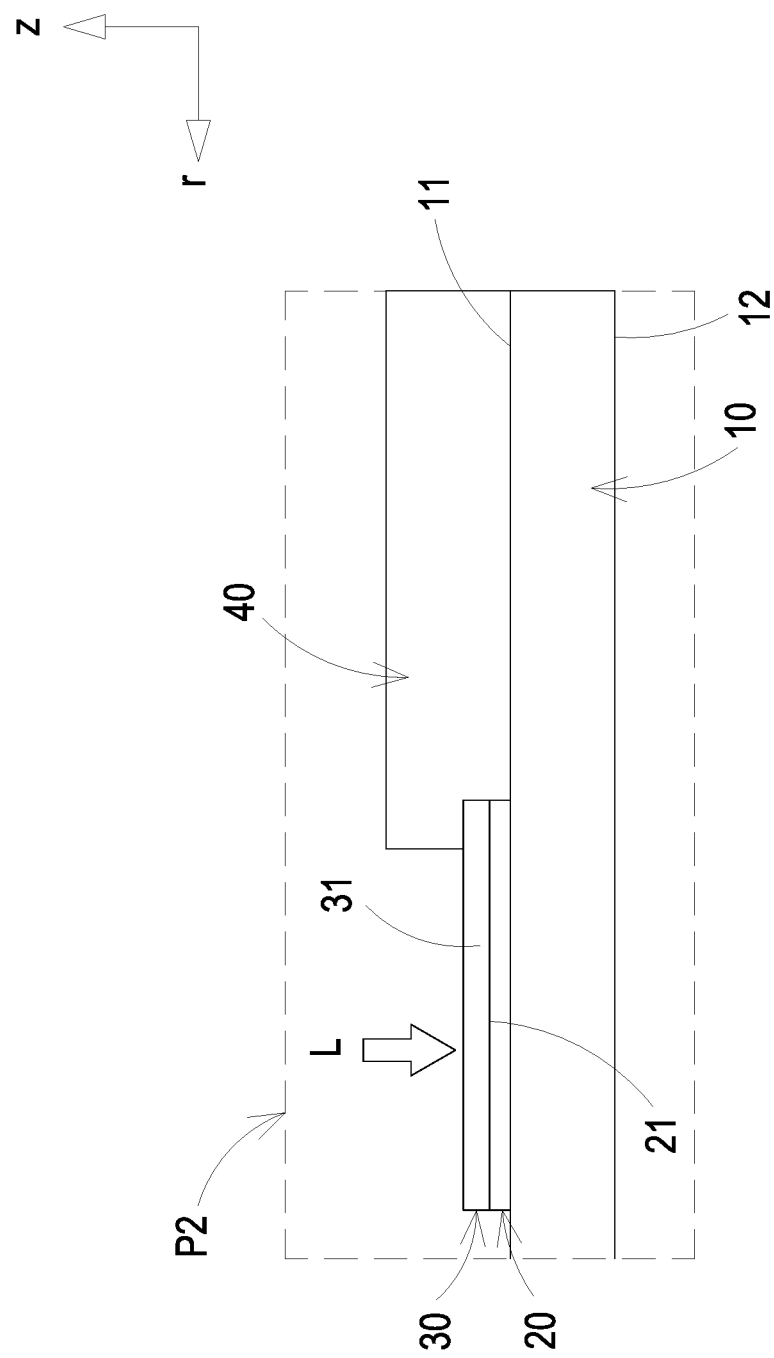
FIG. 5 is a cross-sectional view illustrating the region P2 of FIG. 4.

Referring to FIG. 4 and FIG. 5, in the embodiment, the structures, elements and functions of the wavelength conversion device 1a are similar to those of the wavelength conversion device 1 in FIG. 1, and the elements and features indicated by the numerals similar to those elements and features are not redundantly described herein. Different from the wavelength conversion device 1 in FIG. 1, the thermal conductive layer 40 of the wavelength conversion device 1a partially covers the phosphor layer 30. Since the vertical projection of the thermal conductive layer 40 on the substrate 10 and the vertical projection of the phosphor layer 30 on the substrate 10 are partially overlapped, the direct contact area between the thermal conductive layer 40 and the phosphor layer 30 is increased. During the wavelength conversion, the heat generated at the conversion region 31 of the phosphor layer 30 preferably dissipates via the thermal conductive layer 40. Thus, the heat dissipation pathway of the wavelength conversion device 1a is not hindered by the reflective layer 20, which has a high thermal resistance, and reduces heat accumulation in the conversion region 31 which may deteriorate the wavelength conversion efficiency.

Figure 6:
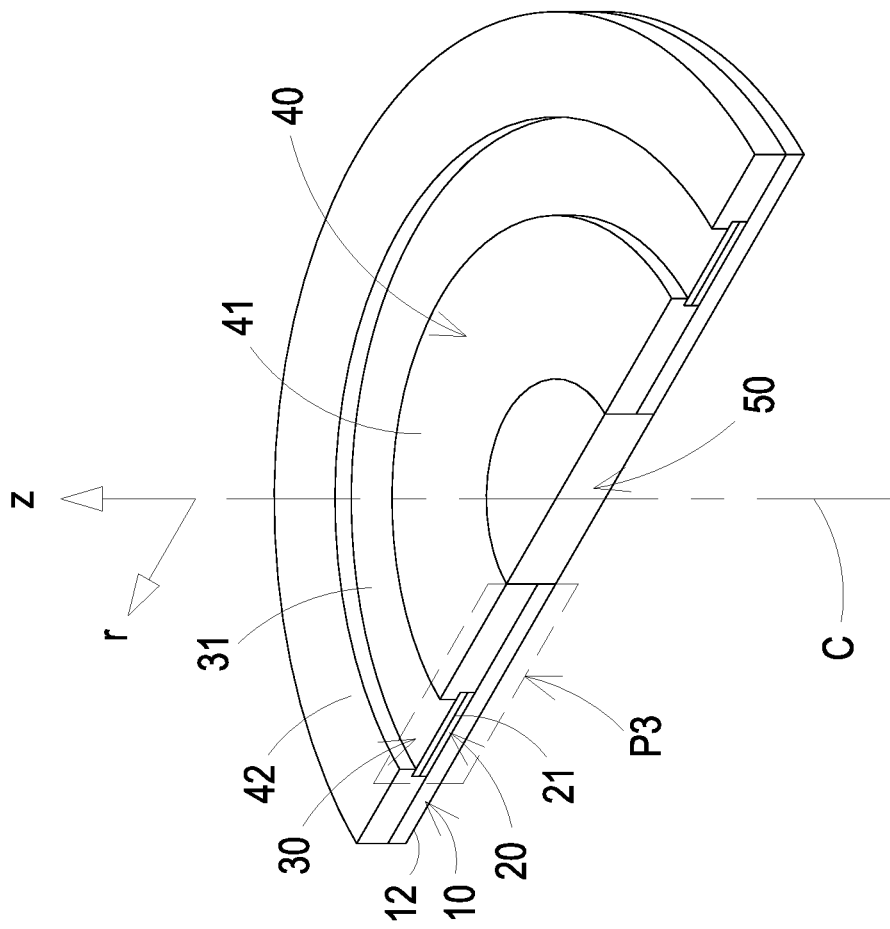
FIG. 6 is a cross-sectional structural view illustrating a wavelength conversion device according to a third embodiment of the present disclosure.
Figure 7:
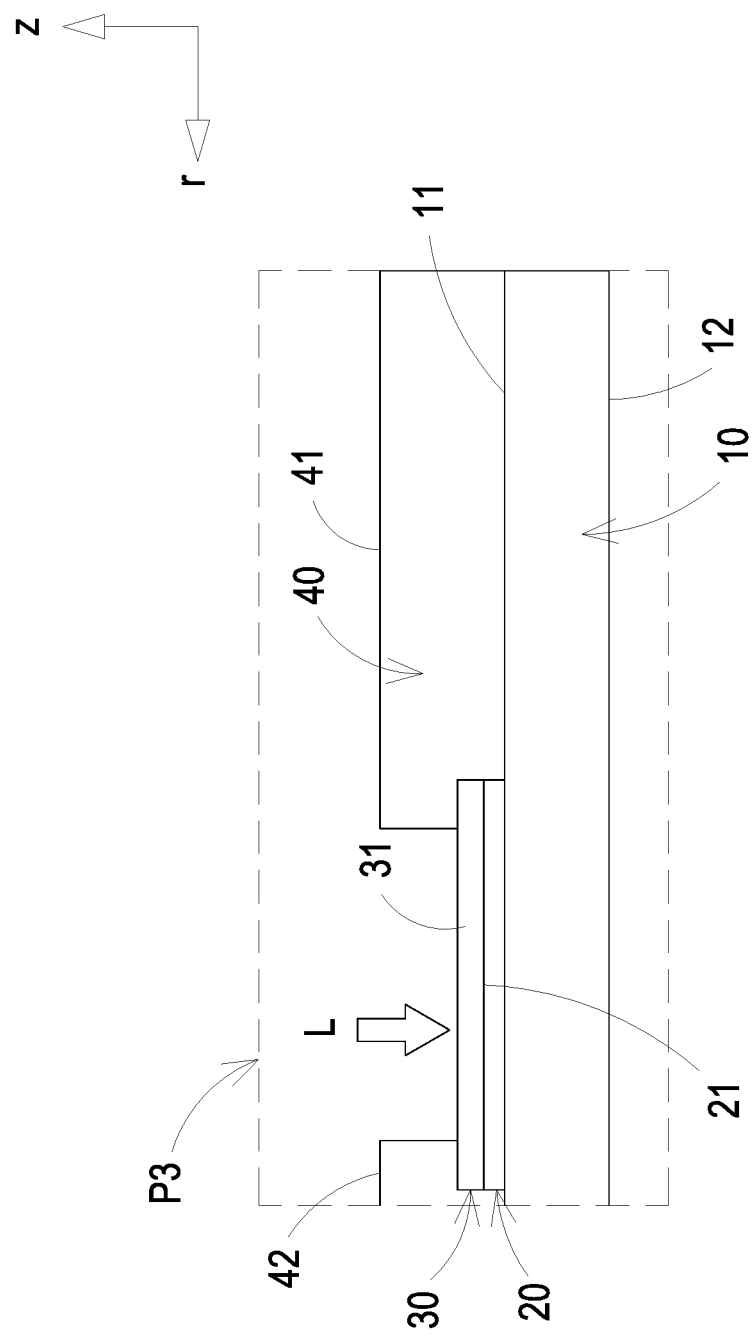
FIG. 7 is a cross-sectional view illustrating the region P3 of FIG. 6.
Figure 8:
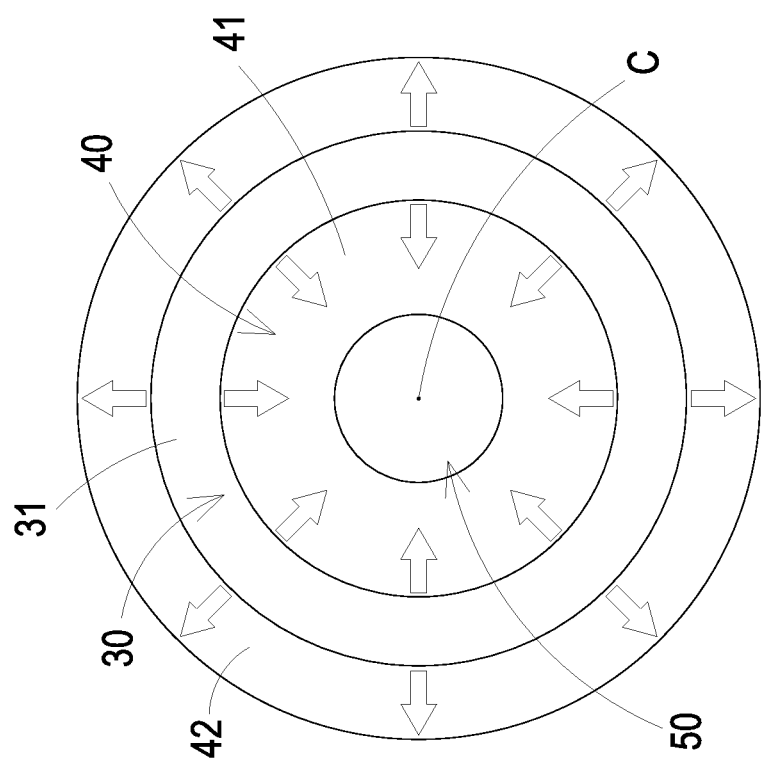
FIG. 8 is a top view illustrating the wavelength conversion device according to the third embodiment of the present disclosure.

Referring to FIGS. 6 to 8, in the embodiment, the structures, elements and functions of the wavelength conversion device 1b are similar to those of the wavelength conversion device 1a in FIG. 4, and the elements and features indicated by the numerals similar to those elements and features are not redundantly described herein. The thermal conductive layer 40 of the wavelength conversion device 1b further includes a first thermal conductive region 41 and a second thermal conductive region 42, which are disposed near two opposite lateral edges of the at least one conversion region 31 of the phosphor layer 30, respectively. In an embodiment, the first thermal conductive region 41 and the second thermal conductive region 42 are arranged in an annular shape, respectively. During the wavelength conversion, the heat generated at the at least one conversion region 31 of the phosphor layer 30 may be conducted in the horizontal direction towards two opposite lateral edges of the at least one conversion region 31. The wavelength conversion device 1b is applicable to, for example, a color wheel of a projector wherein the conversion region 31 is arranged in an annular shape. During the wavelength conversion, the heat generated at the at least one conversion region 31 is conducted inwardly and outwardly in the radial direction r, as shown in FIG. 8. In other words, the wavelength conversion device 1b of the present disclosure further provides the heat transferring path in the horizontal direction, so that the heat generated at the at least one conversion region 31 of the phosphor layer 30 during the wavelength conversion may be dissipated more rapidly and effectively. Heat accumulation in the conversion region 31 is reduced and less likely to cause deterioration of the wavelength conversion.

Figure 9:
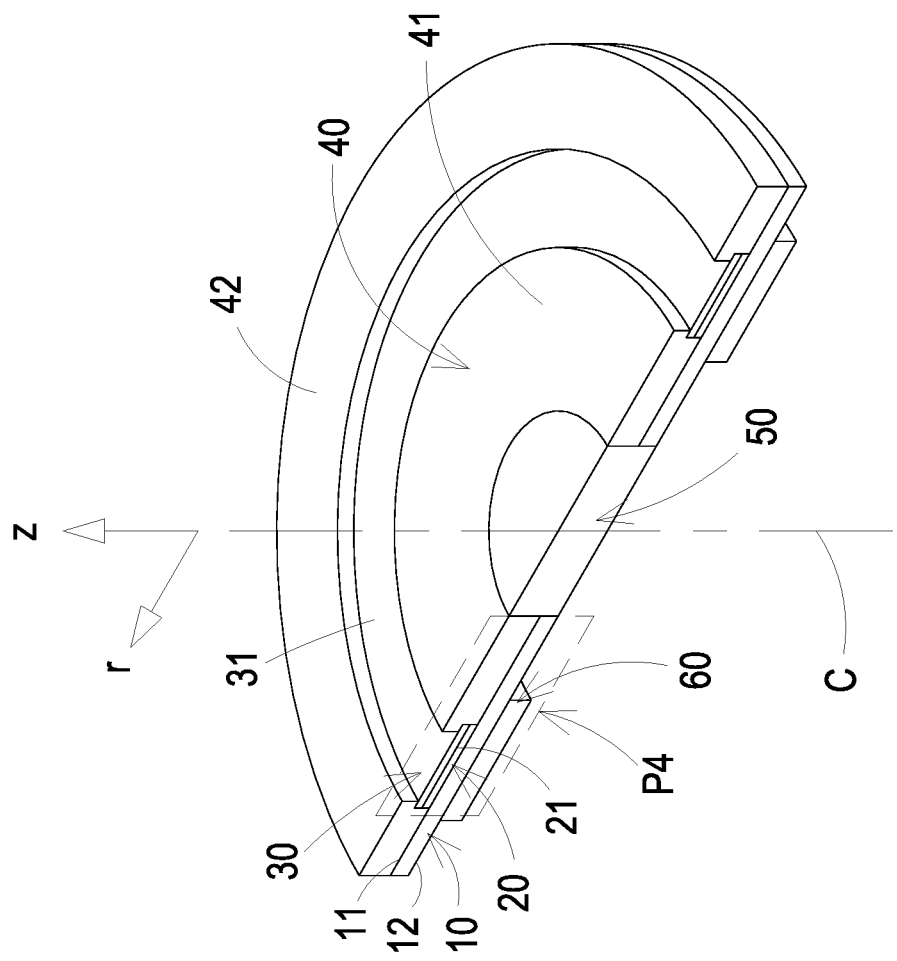
FIG. 9 is a cross-sectional structural view illustrating a wavelength conversion device according to a fourth embodiment of the present disclosure.
Figure 10:
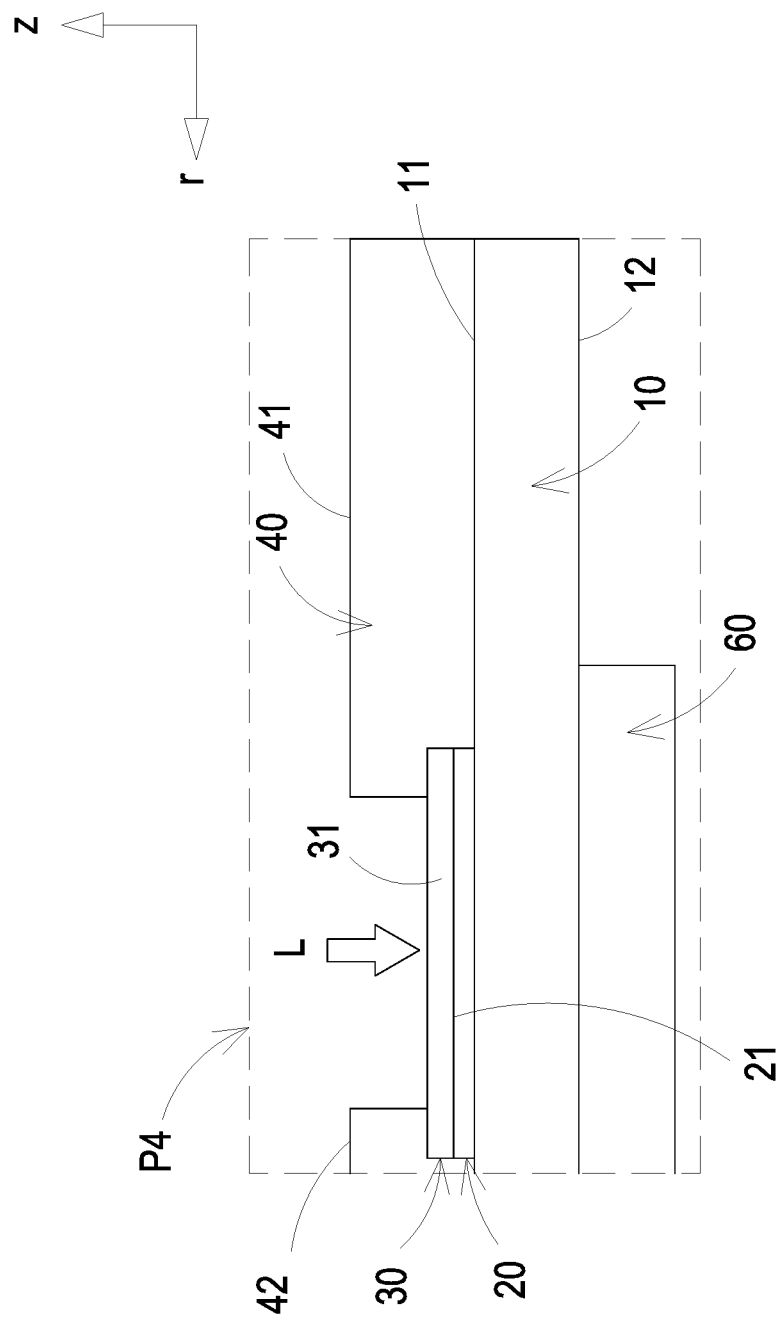
FIG. 10 is a cross-sectional view illustrating the region P4 of FIG. 9.

Referring to FIG. 9 and FIG. 10, in the embodiment, the structures, elements and functions of the wavelength conversion device 1c are similar to those of the wavelength conversion device 1b in FIG. 6, and the elements and features indicated by the numerals similar to those elements and features are not redundantly described herein. The wavelength conversion device 1c further includes an auxiliary thermal conductive layer 60 disposed on the second surface 12 of the substrate 10 and spatially corresponding to the at least one conversion region 31, so that the heat generated at the at least one conversion region 31 during the wavelength conversion is also conducted, for example along a direction corresponding to the z axis. In other words, in addition to the heat transferring path in the horizontal direction (r axis), there is also enhanced heat transferring path in the vertical direction (z axis). In the embodiment, the thermal conductivity coefficient of the thermal conductive layer 40 and the thermal conductivity coefficient of the auxiliary thermal conductive layer 60 are greater than the thermal conductivity coefficient of the phosphor layer 30. The thermal conductivity coefficient of the thermal conductive layer is also greater than the thermal conductivity coefficient of the reflective layer 20. The thermal conductivity coefficient of the phosphor layer 30 is greater than the thermal conductivity coefficient of the reflective layer 20. Preferably but not exclusively, a vertical projection of the auxiliary thermal conductive layer 60 on the substrate 10 and a vertical projection of the thermal conductive layer 40 on the substrate 10 are at least partially overlapped. In an embodiment, the auxiliary thermal conductive layer 60 completely covers the second surface 12 of the substrate 10. Preferably but not exclusively, the thermal conductivity coefficient of the reflective layer 20 ranges from 0.1 W/mK to 2 W/mK. Preferably but not exclusively, the thermal conductivity coefficient of the phosphor layer 30 ranges from 0.5 W/mK to 10 W/mK. Preferably but not exclusively, the thermal conductivity coefficient of the thermal conductive layer 40 and the thermal conductivity coefficient of the auxiliary thermal conductive layer 60 each ranges from 30 W/mK to 5300 W/mK. The thermal conductivity coefficient of the thermal conductive layer 40 and the thermal conductivity coefficient of the auxiliary thermal conductive layer 60 are greater than the thermal conductivity coefficient of the phosphor layer 30 and the thermal conductivity coefficient of the reflective layer 20. The thermal conductivity coefficient of the phosphor layer 30 is greater than the thermal conductivity coefficient of the reflective layer 20. Thus, when the at least one conversion region 31 of the phosphor layer 30 is irradiated by an excitation light, such as a laser light L, the heat generated during the wavelength conversion is preferably conducted from the at least one conversion region 31 to the thermal conductive layer 40 to be dissipated. The generated heat is also conducted from the thermal conductive layer 40 through the substrate 10 to the auxiliary thermal conductive layer 60 to be dissipated. With the arrangement of the wavelength conversion device 1c, the heat transferring path is less hindered by the reflective layer 20 which has a high thermal resistance, and further reduces the heat accumulation in the conversion region 31 which may deteriorate the wavelength conversion efficiency.

The substrate 10 can be for example an aluminum plate. In other embodiment, the substrate 10 may be selected from an aluminum plate, a copper plate, an alumina plate or an aluminum nitride plate. Preferably but not exclusively, titanium dioxide ($TiO_2$) and silicon oxide polymer (Silicone) are mixed and degassed for coating on the first surface 11 of the substrate 10, and further curing for example at 200° C., to form the reflective layer 20. The present disclosure is not limited thereto and, in other embodiment, the reflective layer 20 is formed, for example, by high temperature sintering of titanium dioxide mixed with a glass powder or titanium dioxide mixed with an alumina powder. In addition, preferably but not exclusively, yttrium aluminum garnet (YAG) and silicone are mixed and degassed for coating on the reflective layer 20, and further curing for example at 200° C., to form the phosphor layer 30. In an embodiment, preferably but not exclusive, the phosphor layer 30 is formed by a YAG sintered plate. In other embodiment, the phosphor layer 30 may be formed by other phosphor body. The present disclosure is not limited thereto.

The thermal conductive layer 40 and the auxiliary thermal conductive layer 60 may be made of a thermal conductive material, which includes at least one selected from the group comprising of silver, copper, diamond powder, graphene and other high thermal conductive material, and may be further mixed with a binder. Preferably but not exclusively, the thermal conductive layer 40 and the auxiliary thermal conductive layer 60 are respectively disposed on the first surface 11 and the second surface 12 of the substrate 10 by a coating process, not limited to wet coating of mixed powder or direct sputtering of a target. For example, using a silver paste, the thermal conductive layer 40 and the auxiliary thermal conductive layer 60 are disposed on the first surface 11 and the second surface 12 of the substrate 10, respectively, by a wet coating process, and then curing for example at 200° C. Preferably, the silver paste is made of silver powder mixed with silicone polymer. Preferably, the silver powder has a particle diameter ranging from 0.5 μm to 5 μm. The particles of silver powder may be in a spherical shape or a flake shape. In other embodiments, the silicon polymer can be replaced by an epoxy resin or an organic mixture containing a glass powder. The silver powder contained in the silver paste may range from 60 wt. % to 90 wt. %.

Table 1 shows the pumping test results of a wavelength conversion device without the thermal conductive layer 40 and the auxiliary thermal conductive layer 60, compared with a wavelength conversion device 1c embodiment shown in FIG. 9 and FIG. 10.

|  | Surface temperature, 16.8 W Pumping, Static state (IR measurement, ° C.) | Brightness, 160 W Pumping, Dynamic state, 7200 rpm | Surface temperature, 160 W Pumping, Dynamic state, 7200 rpm (IR measurement, ° C.) |
|---|---|---|---|
| Comparative example | 84.3 | 100% | 116~118 |
| First example | 69.2 | 102.2% | 105~106 |

As shown in Table 1, the wavelength conversion device 1c has a lower surface temperature under 16.8 W pumping in static state. Moreover, under 160 W pumping in 7200 rpm dynamic state, the wavelength conversion device 1c has a lower surface temperature, and the wavelength conversion efficiency (represented by Brightness) has not deteriorated. Compared with the comparative example which do not have the thermal conductive layer 40 and the auxiliary thermal conductive layer 60, the wavelength conversion device 1c has better heat dissipation. That is, the surface temperature of the conversion region 31 of the wavelength conversion device 1c can be reduced more effectively.

Table 2 shows the pumping test results of another comparative example, comparing heat dissipation effectiveness of another example of the wavelength conversion device 1c (Second example).

|  | Surface temperature, 16.8 W Pumping, Static state (IR measurement, ° C.) | Brightness, 160 W Pumping, Dynamic state, 7200 rpm | Surface temperature, 160 W Pumping, Dynamic state, 7200 rpm (IR measurement, ° C.) |
| --- | --- | --- | --- |
| Comparative example | 84.3 | 100% | 116~118 |
| Second example | 67.9 | 103.7% | 103~105 |

In the Second example, the substrate 10 is an aluminum nitride substrate. Reflective layer 20 is formed on the first surface 11 of the substrate 10 using titanium dioxide ($TiO_2$) mixed with glass powder, cellulose and mono-butyl ether for coating, degassing, drying and high-temperature sintering. Phosphor layer 30 is formed on the reflective surface 21 of the reflective layer 20 using yttrium aluminum garnet (YAG) mixed with a glass powder, cellulose and mono-butyl ether for coating, degassing, drying and high-temperature sintering The thermal conductive layer 40 and the auxiliary thermal conductive layer 60 are silver paste, and are disposed on the first surface 11 and the second surface 12 of the substrate 10, by a coating process. Then, drying and high-temperature sintering are performed to obtain the Second example of the wavelength conversion device 1c.

As shown in Table 2, the Second example of the wavelength conversion device 1c has a lower surface temperature under 16.8 W pumping in static state. Moreover, under 160 W pumping in 7200 rpm dynamic state, the Second example of the wavelength conversion device 1c has a lower surface temperature, and the wavelength conversion efficiency (represented by Brightness) has not deteriorated. Compared with the comparative example which does not have the thermal conductive layer 40 and the auxiliary thermal conductive layer 60, the wavelength conversion device 1c has better heat dissipation and the surface temperature of the conversion region 31 of the wavelength conversion device 1c can be reduced more effectively.

Figure 11:
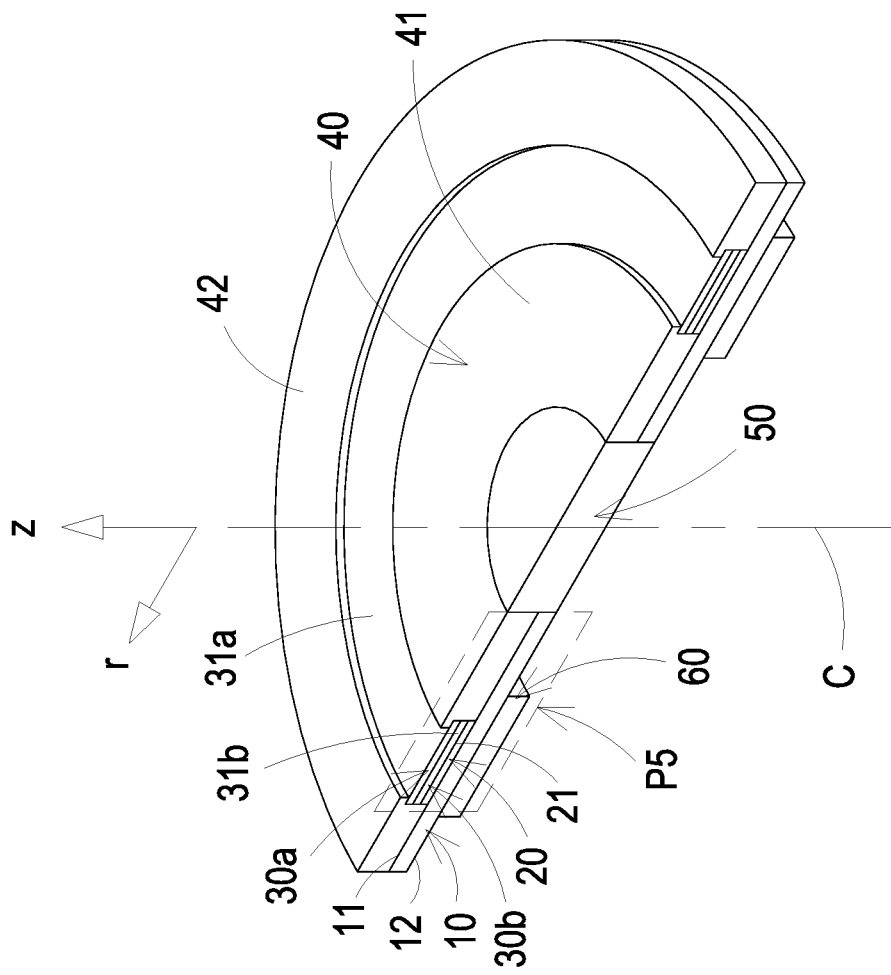
FIG. 11 is a cross-sectional structural view illustrating a wavelength conversion device according to a fifth embodiment of the present disclosure.
Figure 12:
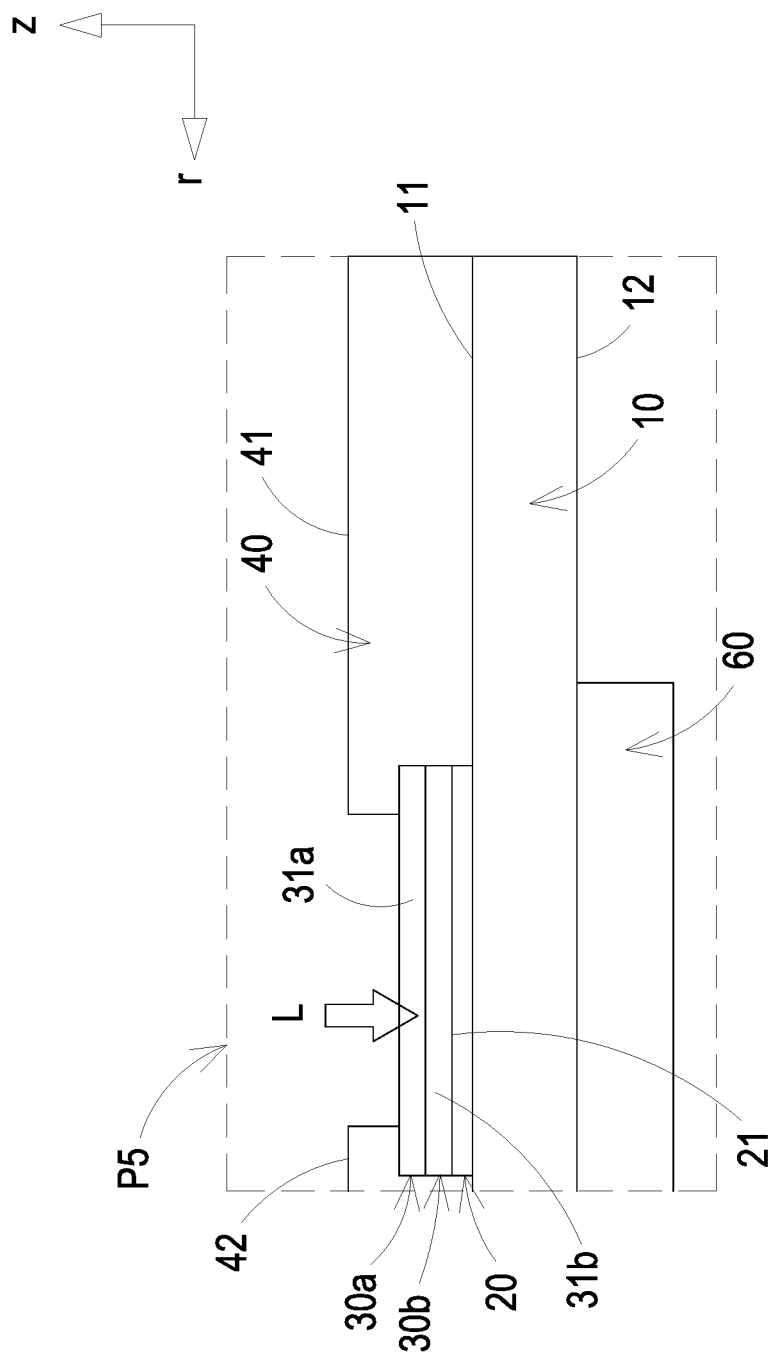
FIG. 12 is a cross-sectional view illustrating the region P5 of FIG. 11.

Referring to FIG. 11 and FIG. 12, in the embodiment, the structures, elements and functions of the wavelength conversion device 1d are similar to those of the wavelength conversion device 1c in FIG. 9, and the elements and features indicated by the numerals similar to those elements and features are not redundantly described herein. The wavelength conversion device 1d includes a first phosphor layer 30a and a second phosphor layer 30b stacked on the reflective surface 21 of the reflective layer 20. The stacking arrangement of the first phosphor layer 30a and the second phosphor layer 30b is not limited in an order. Preferably but not exclusively, the thermal conductivity coefficient of the reflective layer 20 ranges from 0.1 W/mK to 2 W/mK. Preferably but not exclusively, the thermal conductivity coefficient of the first phosphor layer 30a and the thermal conductivity coefficient of the second phosphor layer 30b each ranges from 0.5 W/mK to 10 W/mK. As the thickness of the first phosphor layer 30a and the thickness of the second phosphor layer 30b are increased, the thermal resistance in a direction along the first conversion region 31a, the second conversion region 31b and the reflective layer 20 is increased. Preferably but not exclusively, the thermal conductivity coefficient of the thermal conductive layer 40 and the thermal conductivity coefficient of the auxiliary thermal conductive layer 60 each range from 30 W/mK to 5300 W/mK, and is greater than the thermal conductivity coefficient of the reflective layer 20. The thermal conductivity coefficient of the thermal conductive layer 40 and the thermal conductivity coefficient of the auxiliary thermal conductive layer 60 are also greater than the thermal conductivity coefficient of the first phosphor layer 30a and the thermal conductivity coefficient of the second phosphor layer 30b. In the embodiment shown, the thermal conductive layer 40 has a thickness greater than a summation of thicknesses of the reflective layer 20, the first phosphor layer 30a and the second phosphor layer 30b. In the embodiment, a vertical projection of the thermal conductive layer 40 on the substrate 10 and a vertical projection of the first phosphor layer 30a on the substrate 10 are at least partially overlapped. Also, a vertical projection of the auxiliary thermal conductive layer 60 on the substrate 10 and the vertical projection of the thermal conductive layer 40 on the substrate 10 are at least partially overlapped. Thus, when the first conversion region 31a and the second conversion region 31b are irradiated by an excitation light, such as a laser light L, the heat generated during the wavelength conversion is conducted and dissipated via heat transferring paths through the thermal conductive layer 40, the substrate 10 and the auxiliary thermal conductive layer 60. Accordingly, the heat transferring path is less hindered by the reflective layer 20 which has a high thermal resistance. Heat accumulation in the first conversion region 31a and the second conversion region 31b which may deteriorate the wavelength conversion efficiency, may be more effectively reduced.

In summary, the present disclosure provides a wavelength conversion device, applicable to a color wheel of a projector. By disposing the thermal conductive layer adjacent to at least one lateral edge of the phosphor layer, the thermal conductive layer is directly connected to the conversion region. Thus, the heat generated from the conversion region during the wavelength conversion can be more effectively dissipated. The configuration of the present disclosure reduces the effect by the heat transferring path being hindered by the reflective layer, which has high thermal resistance, found in conventional devices. Lowering heat being accumulated in the conversion region reduces deterioration of the wavelength conversion efficiency. Moreover, a conversion region (exposed for receiving a light beam) of the phosphor layer being defined by the surrounding thermal conductive layer partially covering the phosphor layer, provides for the direct contact area of the thermal conductive layer and the phosphor layer to be potentially maximized for better heat dissipation. As previously described, the heat generated at the conversion region during the wavelength conversion can directly conduct from the phosphor layer to the thermal conductive layer which has a high thermal conductivity. By increasing and maximizing the direct contact area of the thermal conductive layer and the phosphor layer, heat dissipation efficiency may be enhanced. Furthermore, providing the thermal conductive layers disposed on two opposite sides of the substrate further increases the thermal conductive area contact between the thermal conductive layers and the substrate. Moreover, the present disclosure provides improved heat dissipation over the prior art by reducing the hindrance caused by the thermal resistance effect of the reflective layer which has a low thermal conductivity coefficient.

While the disclosure has been described in terms of what is presently considered to be the most practical and preferred embodiments, it is to be understood that the disclosure needs not be limited to the disclosed embodiment, and is intended to cover various modifications and similar arrangements included within the scope of the appended claims and encompass all such modifications and similar structures.

What is claimed is:

1. A wavelength conversion device comprising:
a substrate comprising at least one surface;
a reflective layer disposed on the at least one surface of the substrate;
a phosphor layer disposed on the reflective layer and comprising at least one conversion region configured to receive a light beam and convert a wavelength of the light beam; and
a thermal conductive layer disposed on the at least one surface of the substrate and adjacent to the phosphor layer, wherein the thermal conductive layer is directly connected to the at least one conversion region for conducting a heat generated at the at least one conversion region during a wavelength conversion.

2. The wavelength conversion device according to claim 1, wherein the thermal conductive layer partially covers the phosphor layer and exposes the at least one conversion region for receiving the light beam and converting the wavelength of the light beam.

3. The wavelength conversion device according to claim 1, wherein a thermal conductivity coefficient of the thermal conductive layer is greater than a thermal conductivity coefficient of the phosphor layer.

4. The wavelength conversion device according to claim 1, wherein a thermal conductivity coefficient of the phosphor layer is greater than a thermal conductivity coefficient of the reflective layer.

5. The wavelength conversion device according to claim 1, wherein the thermal conductive layer is disposed on the at least one surface of the substrate by a coating process.

6. The wavelength conversion device according to claim 1, wherein the wavelength conversion device is a color wheel, and the reflective layer and the phosphor layer are arranged in an annular shape, respectively.

7. The wavelength conversion device according to claim 1, further comprising a driving component connected to the substrate and configured to drive the substrate to displace the wavelength conversion device.

8. The wavelength conversion device according to claim 1, wherein the thermal conductive layer comprises a thermal conductive material comprising at least one selected from a group comprising of: silver, copper, diamond powder and graphene.

9. The wavelength conversion device according to claim 1, wherein the reflective layer comprises titanium dioxide, and wherein the substrate comprises at least one selected from a group comprising: an aluminum plate, a copper plate, an alumina plate and an aluminum nitride plate.

10. A wavelength conversion device comprising:
a reflective layer;
a phosphor layer disposed on the reflective layer and comprising at least one conversion region configured to receive a light beam and convert a wavelength of the light beam;
a substrate comprising a first surface, wherein the reflective layer is disposed between the phosphor layer and the substrate; and
a thermal conductive layer disposed adjacent to the phosphor layer and directly connected to the at least one conversion region such that a heat generated at the at least one conversion region during a wavelength conversion is transferred from the at least one conversion region of the phosphor layer to the thermal conductive layer.

11. The wavelength conversion device according to claim 10, wherein the thermal conductive layer is disposed on the first surface of the substrate and directly connected to at least one lateral edge of the phosphor layer.

12. The wavelength conversion device according to claim 10, wherein the wavelength conversion device is a color wheel, and the reflective layer and the phosphor layer are arranged in an annular shape, respectively.

13. The wavelength conversion device according to claim 10, further comprising a driving component connected to the substrate and configured to drive the wavelength conversion device to rotate about a rotating shaft.

14. The wavelength conversion device according to claim 10, wherein the substrate comprises a second surface, wherein the wavelength conversion device further comprises an auxiliary thermal conductive layer disposed on the second surface of the substrate, the second surface of the substrate being opposite to the first surface of the substrate.

15. The wavelength conversion device according to claim 14, wherein a vertical projection of the auxiliary thermal conductive layer on the substrate and a vertical projection of the thermal conductive layer on the substrate are at least partially overlapped.

16. The wavelength conversion device according to claim 10, wherein the thermal conductive layer comprises a first thermal conductive region and a second thermal conductive region, and wherein the first and second thermal conductive regions are disposed adjacent to two opposite lateral edges of the phosphor layer, respectively.

17. The wavelength conversion device according to claim 10, wherein the thermal conductive layer comprises a thickness greater than a thickness of both the reflective layer and the phosphor layer.

18. A wavelength conversion device comprising:
a substrate comprising a plate with two opposite sides;
a first phosphor layer comprising at least one conversion region configured to receive a light beam and convert a wavelength of the light beam, wherein the first phosphor layer is disposed on one of the two opposite sides of the substrate;
a reflective layer disposed between the first phosphor layer and the substrate; and
a thermal conductive layer disposed on the same side of the substrate as the first phosphor layer, wherein the thermal conductive layer is disposed adjacent to the first phosphor layer and directly connected to the at least one conversion region, wherein a thermal conductivity coefficient of the thermal conductive layer is greater than a thermal conductivity coefficient of the first phosphor layer, and wherein the thermal conductivity coefficient of the first phosphor layer is greater than a thermal conductivity coefficient of the reflective layer.

19. The wavelength conversion device according to claim 18, further comprising a second phosphor layer configured in a stacking arrangement with the first phosphor layer.

20. The wavelength conversion device according to claim 18, wherein the wavelength conversion device is a color wheel, and wherein the reflective layer and the first phosphor layer are arranged in an annular shape on the color wheel.

* * * * *